United States Patent
Brittain et al.

(10) Patent No.: US 9,632,954 B2
(45) Date of Patent: Apr. 25, 2017

(54) MEMORY QUEUE HANDLING TECHNIQUES FOR REDUCING IMPACT OF HIGH-LATENCY MEMORY OPERATIONS

(75) Inventors: Mark A. Brittain, Pflugerville, TX (US); John Steven Dodson, Pflugerville, TX (US); Benjiman L. Goodman, Cedar Park, TX (US); Stephen J. Powell, Austin, TX (US); Eric E. Retter, Austin, TX (US); Jeffrey A. Stuecheli, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1233 days.

(21) Appl. No.: 13/290,702

(22) Filed: Nov. 7, 2011

(65) Prior Publication Data

US 2013/0117513 A1  May 9, 2013

(51) Int. Cl.
 G06F 12/00 (2006.01)
 G06F 13/16 (2006.01)

(52) U.S. Cl.
 CPC ......... *G06F 13/1626* (2013.01); *G06F 13/16* (2013.01)

(58) Field of Classification Search
 None
 See application file for complete search history.

(56) References Cited

U.S. PATENT DOCUMENTS 5,557,769 A * 9/1996 Bailey et al. ............... 711/146
5,568,620 A    10/1996 Sarangdhar et al.
6,298,413 B1  10/2001 Christenson
6,370,073 B2   4/2002 Leung
6,385,708 B1   5/2002 Stracovsky et al.
6,587,918 B1   7/2003 Christenson
7,043,599 B1   5/2006 Ware et al.
7,047,374 B2   5/2006 Sah et al.
7,076,587 B2   7/2006 Routliffe et al.
(Continued)

FOREIGN PATENT DOCUMENTS

JP        06036558        2/1994

OTHER PUBLICATIONS

Phadke et al., "MLP Aware heterogeneous Memory System," Design, Automation & Test in Europe Conference & Exhibition Mar. 14-18, 2011.

*Primary Examiner* — Daniel Tsui
(74) *Attorney, Agent, or Firm* — Mitch Harris, Atty at Law, LLC; Andrew M. Harris; Steven L. Bennett

(57) ABSTRACT

Techniques for handling queuing of memory accesses prevent passing excessive requests that implicate a region of memory subject to a high latency memory operation, such as a memory refresh operation, memory scrubbing or an internal bus calibration event, to a re-order queue of a memory controller. The memory controller includes a queue for storing pending memory access requests, a re-order queue for receiving the requests, and a control logic implementing a queue controller that determines if there is a collision between a received request and an ongoing high-latency memory operation. If there is a collision, then transfer of the request to the re-order queue may be rejected outright, or a count of existing queued operations that collide with the high latency operation may be used to determine if queuing the new request will exceed a threshold number of such operations.

28 Claims, 4 Drawing Sheets

(56) References Cited

U.S. PATENT DOCUMENTS

| | | |
|---|---|---|
| 7,277,982 B2 | 10/2007 | Calvignac et al. |
| 7,558,270 B1 | 7/2009 | Wilford et al. |
| 7,724,589 B2 | 5/2010 | Rajan et al. |
| 7,724,602 B2 | 5/2010 | Hur et al. |
| 7,739,461 B2 | 6/2010 | Hur et al. |
| 7,934,070 B2 | 4/2011 | Brittain et al. |
| 2002/0194444 A1 | 12/2002 | Goodrich, II et al. |
| 2009/0063773 A1* | 3/2009 | Rajwar et al. ............... 711/125 |
| 2009/0216959 A1* | 8/2009 | Allison et al. ............... 711/149 |
| 2009/0327623 A1* | 12/2009 | Ochiai ........................ 711/154 |
| 2011/0099341 A1 | 4/2011 | Resnick |
| 2011/0179240 A1 | 7/2011 | Sukonik |
| 2011/0238941 A1* | 9/2011 | Xu et al. ..................... 711/169 |

\* cited by examiner

MEMORY QUEUE HANDLING TECHNIQUES FOR REDUCING IMPACT OF HIGH-LATENCY MEMORY OPERATIONS

BACKGROUND OF THE INVENTION

1. Field of the Invention

The present invention is related to processing systems and processors, and more specifically to techniques for handling queuing of requests to memory devices that reduce the impact of high-latency memory operations such as refresh.

2. Description of Related Art

Present day memory controllers include substantial queuing mechanisms that facilitate forward queuing of memory requests. A command queue is used to store incoming requests, which are then processed and placed in a re-order queue, that permits issuing of memory operations that can be processed with overlap, such as accesses to different devices, or sub-arrays that can be accessed independently. By re-ordering operations, the memory bandwidth can be substantially improved over that of memories in which operations must be performed sequentially.

Memory controllers, in addition to providing access to the memory devices and using queues to improve throughput, must also queue accesses while portions of the memory are unavailable for access. Dynamic random-access memories (DRAMS) typically require substantial internally-timed or externally-timed refresh intervals, and memories in general such as static random-access memories (SRAMS) and DRAMS have other housekeeping logic that performs non-memory access housekeeping operations such as bus calibration operations, making some memory regions inaccessible for significant periods during which memory accesses must be queued.

It would therefore be desirable to provide a memory controller and a method of managaing memory operations that improve performance of memory accesses, in particular when high-latency housekeeping operations such as DRAM refresh or bus calibration must be performed.

BRIEF SUMMARY OF THE INVENTION

The invention is embodied in a memory controller, computer system, and method that provide access to memory devices by a processor using a memory controller. The method is a method of operation of the memory controller.

The memory controller includes a memory operation queue in which memory access operations are buffered as they are received and a re-order queue in which operations are queued according to rules that help determine an order in which the memory operations can be completed without conflicts with other accesses or housekeeping operations such as bus calibration or DRAM refresh operations. The memory operation queue may represent the lowest level queuing structure in a cascade of queuing structures interposed between the processor cores and the memory interfaces. Control logic that manages transfer of memory operations to the re-order queue first determines whether the re-order queue has an entry available, and then determines whether the memory access up next for transfer to the re-order queue will conflict with a high-latency housekeeping operation. If a conflict will occur, the control logic holds off on transferring the memory access operation at the head of the memory operation queue and moves to the next oldest entry in the memory operation queue to find a candidate for transfer to the re-order queue. As an alternative to holding off the colliding requests out-right, a threshold number of such requests can be accepted in the re-order queue before the control logic begins to hold off queuing requests that collide with the high-latency housekeeping operations.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

DETAILED DESCRIPTION OF THE INVENTION

The present invention relates to memory controllers and other circuits and computer systems in which received memory accesses are buffered in a memory access queue and then transferred to a re-order queue, from which the memory access operations are issued out-of-order, improving memory access throughput. In order to reduce the impact of high-latency memory operations, which are generally housekeeping operations such as DRAM refresh and bus calibration events, which can take place in any type of memory in which environmental factors such as temperature and/or power supply voltage are taken into account by adjusting operating characteristics of the memory devices, by changing compensation for bus skew and delay, or by physically affecting the skew/delay. The present invention provides a mechanism for preventing the re-order queue, which is generally smaller than one or more memory access queues (buffers) that store memory access operations as they arrive at the memory controller's bus interface, from being filled with memory access operations that cannot be performed due to high latency memory operations that are underway.

Figure 1:
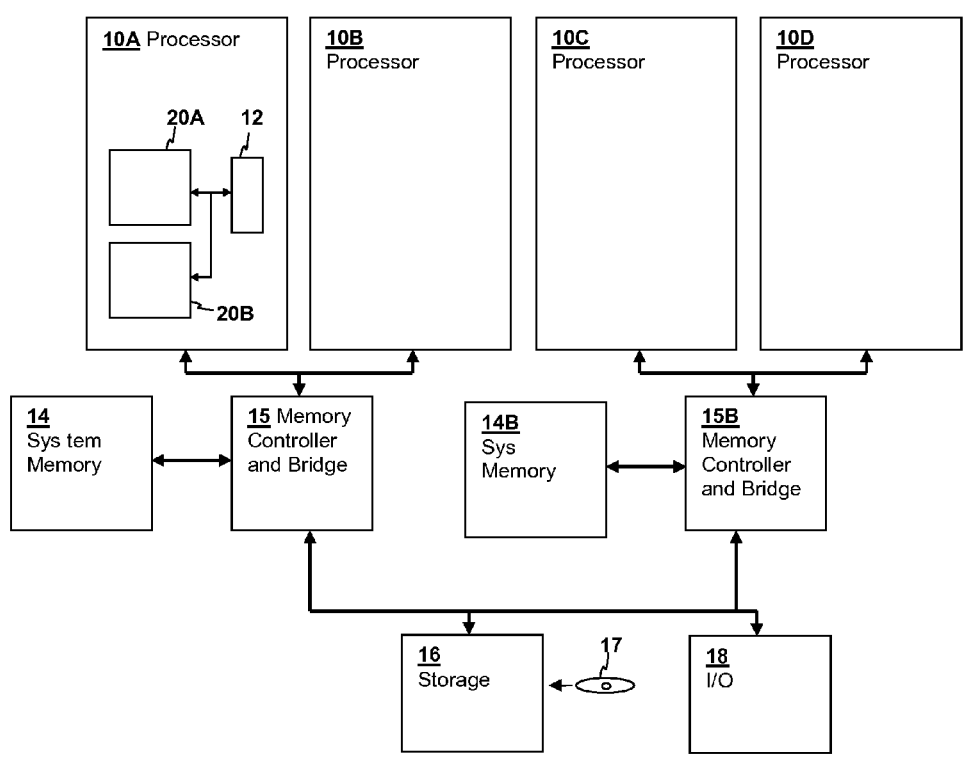
FIG. 1 is a block diagram illustrating a processing system in which techniques according to an embodiment of the present invention are practiced.

Referring now to FIG. 1, a processing system in accordance with an embodiment of the present invention is shown. The depicted processing system includes a number of processors 10A-10D, each coupled to a memory controller/bridge 15A, 15B in conformity with an embodiment of the present invention. The depicted multi-processing system is illustrative, and processing system in accordance with other embodiments of the present invention include uni-processor systems having symmetric multi-threading (SMT) cores. Processors 10A-10D are identical in structure and include cores 20A-20B and cache/local storage 12, which may be a cache level, or a level of internal system memory.

Processors 10A-10B are coupled to main system memory 14 by memory controller/bridge 15A, a storage subsystem 16, which includes non-removable drives and optical drives, for reading media such as a CD-ROM 17 forming a computer program product and containing program instructions implementing operating systems and other software for execution by processors 10A-10D, The illustrated processing system also includes input/output (I/O) interfaces and devices 18 such as mice and keyboards for receiving user input and graphical displays for displaying information. Processors 10C-10D are similarly coupled to main system memory 14, storage subsystem 16, which includes non-removable drives and optical drives, for reading media such as CD-ROM 17, by memory controller/bridge 15B. While the system of FIG. 1 is used to provide an illustration of a system in which the processor architecture of the present invention is implemented, it is understood that the depicted architecture is not limiting and is intended to provide an example of a suitable computer system in which the techniques of the present invention are applied.

Figure 2A:
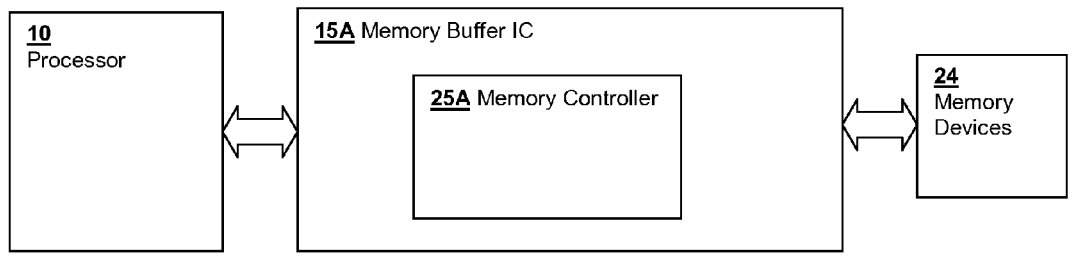
FIGS. 2A-2C depict different memory controller architectures in which techniques according to embodiments of the present invention can be practiced.
Figure 2B:
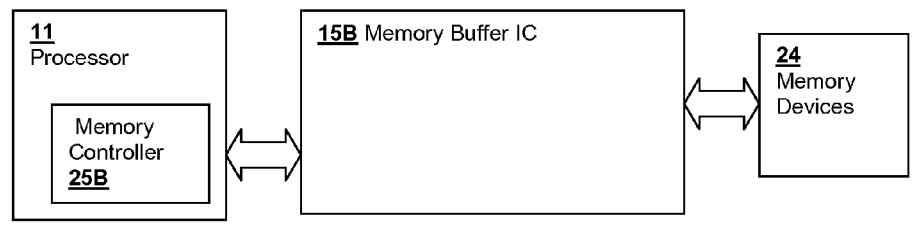
Figure 2C:
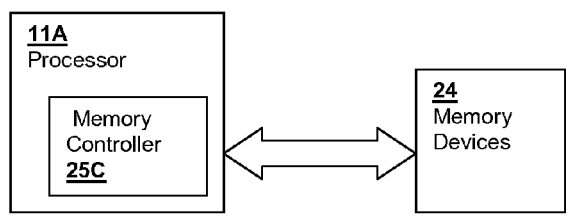

Referring now to FIGS. 2A-2C configurations of memory controller circuits in accordance with various embodiments of the invention are shown. FIG. 2A depicts an arrangement in which a memory buffer integrated circuit (IC) 15A that includes a memory controller 25A and couples a processor 10 via a processor bus, e.g., a front-side bus (FSB) to memory devices 24 that may be, for example, dual in-line memory modules (DIMMs) containing DRAM storage. The arrangement of FIG. 2A is thus similar to the arrangement of FIG. 1, in which a separate memory controller is interposed between a processor and memory devices. FIG. 2B depicts an alternative arrangement in which techniques of the present invention may also be practiced, in which a memory buffer IC 15B is also interposed between a processor 11 and memory devices 24, but memory controller 25B is integrated within processor 11. FIG. 2C depicts yet another alternative in which processor 11A is coupled directly to memory devices 24 and in which memory controller 25C is integrated. The examples illustrated in FIGS. 2A-2C and described above are not exhaustive, and the memory operation buffers and control logic that will be described in further detail below are not limited as to location within particular devices that implement processors, memory, and the devices that couple them within a processing system according to embodiments of the present invention.

Figure 3:
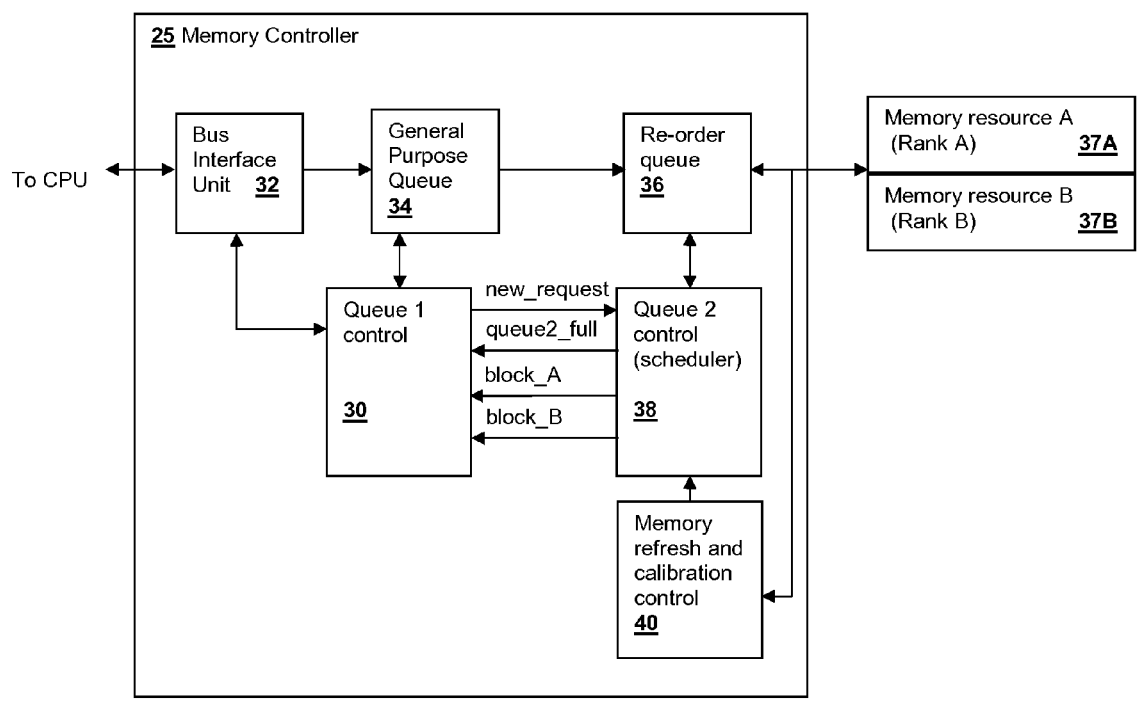
FIG. 3 is a block diagram illustrating details of a memory controller 25 in accordance with an embodiment of the present invention.

Referring now to FIG. 3, details of a memory controller 25 in accordance with an embodiment of the present invention is shown, circuits of which can be used to implement memory controllers 25A-25C, of FIGS. 2A-2C, respectively. Memory controller 25 includes a bus interface unit 32 that receives memory access operation commands from a bus that interfaces memory controller 25 to upstream cache/processor circuits, and delivers the memory access operations to a general purpose queue 34 (buffer) that stores the memory access operations as they are received. A queue controller 30 is coupled to bus interface unit 32 and manages transfer of the memory access operations between general purpose queue 34 and a re-order queue 36 that allows for out-of-order issue of memory operations to memory resource A 37A and memory resource B 37B. Re-order queue 36 generally has fewer entries available than general-purpose queue, since the logic required to support out-of-order issuance of memory operations into the memory resources 37A, 37B generally requires the application of rules to manage the re-ordered issue, as well as determining in advance of issuing the memory access operation, which device(s) and rank(s) are implicated by the operation. Re-order queue 36 is managed by another queue control circuit 38 that performs the scheduled issue of memory operations from re-order queue 36 that optimizes performance by reducing latency that would otherwise be present due to overlapping accesses to memory resource A 37A and memory resource B 37B, and/or by alternating accesses between memory resource A 37A and memory resource B 37B. Memory resource A 37A and memory resource B 37B may represent memory ranks or columns or other subdivision of memory and are only exemplary memory resources, since the number of memory resources present will generally be much greater than two, for example the number of memory resources may be the number of memory ranks present and supported by the memory subsystem.

A memory refresh and calibration control block 40 are depicted as located within memory controller 25 to initiate refresh operations and bus calibration operations within memory resource A 37A and memory resource B 37B. In accordance with an embodiment of the present invention, queue control 30 generates a control signal new_request after queue control 38 de-asserts control signal queue2_full, indicating that an entry is available in re-order queue 36 and if general purpose queue 34 contains an entry for which transfer should not be rejected due to a high-latency housekeeping operation taking place in one of memory resource A 37A and memory resource B 37B that would collide with the memory address(es) associated with the entry.

Queue control 38 provides control signals block_A and block_B that indicate that a high-latency operation is taking place in memory resource A 37A and memory resource B 37B, respectively. Queue control 30 uses control signals block_A and block_B to qualify whether or not to transfer a memory access operation to re-order queue 36 by asserting control signal new_request and providing the memory access operation over a bus connecting general purpose queue 34 to re-order queue 36. Alternatively, queue control 30 can issue the transfer, and queue control 38 can reject the transfer by responding with a retry indication, which provides an implementation in which, for example, general purpose queue 34 can be located within a first device such as a processor and re-order queue 36 can be located within a second device such as a memory device, which may be embodied in a configuration such as that depicted in FIG. 2C. Only two control signals block_A and block_B are illustrated for clarity, but in practice, a vector of block signals are provided (block_A, block_B, block_C, . . . ) one for each of a plurality of memory resources. The total number of block signals in the vector is determined by the maximum number of memory resources (ranks) that a particular memory subsystem supports.

Queue control 30 will assert control signal new_request only if control signal queue2_full is not asserted, and if an entry is available in general purpose queue 34 having a memory access operation address that does not collide with an address indicated by one of control signals block_A and block_B. Queue control 30 can rotate through entries in general purpose queue 34, holding entries for which collisions are present, while transferring other operations that do not collide with high-latency memory operations to re-order queue 36. Queue control 38 generates control signals block_A and block_B, when memory refresh and calibration control 40 has issued a high-latency housekeeping operation, such as a row refresh operation, that implicates ranks/sub-arrays within, or the entirety of, memory resource A 37A and memory resource B 37B Timing information may be used by queue control 38 to de-assert control signals block_A and block_B in advance of the high-latency operation being completed, so that re-order queue 36 can start processing the operations that were previously held off due to anticipated collision with the high-latency operation. Alternatively, or in combination, timing information may also be used by queue control 38 to start holding off memory access operations in advance of the high-latency operation actually commencing, in order to attempt to avoid having any colliding entries within re-order queue 36. In accordance with yet another embodiment of the invention, queue control 38 can also maintain a count of memory access operations within re-order queue that collide with a high-latency operation underway, determine whether the count is greater than a threshold to determine whether to accept any other colliding memory access operations, thus permitting only a predetermined number of memory access operations that collide with the high-latency operation to be present in re-order queue 36.

Figure 4:
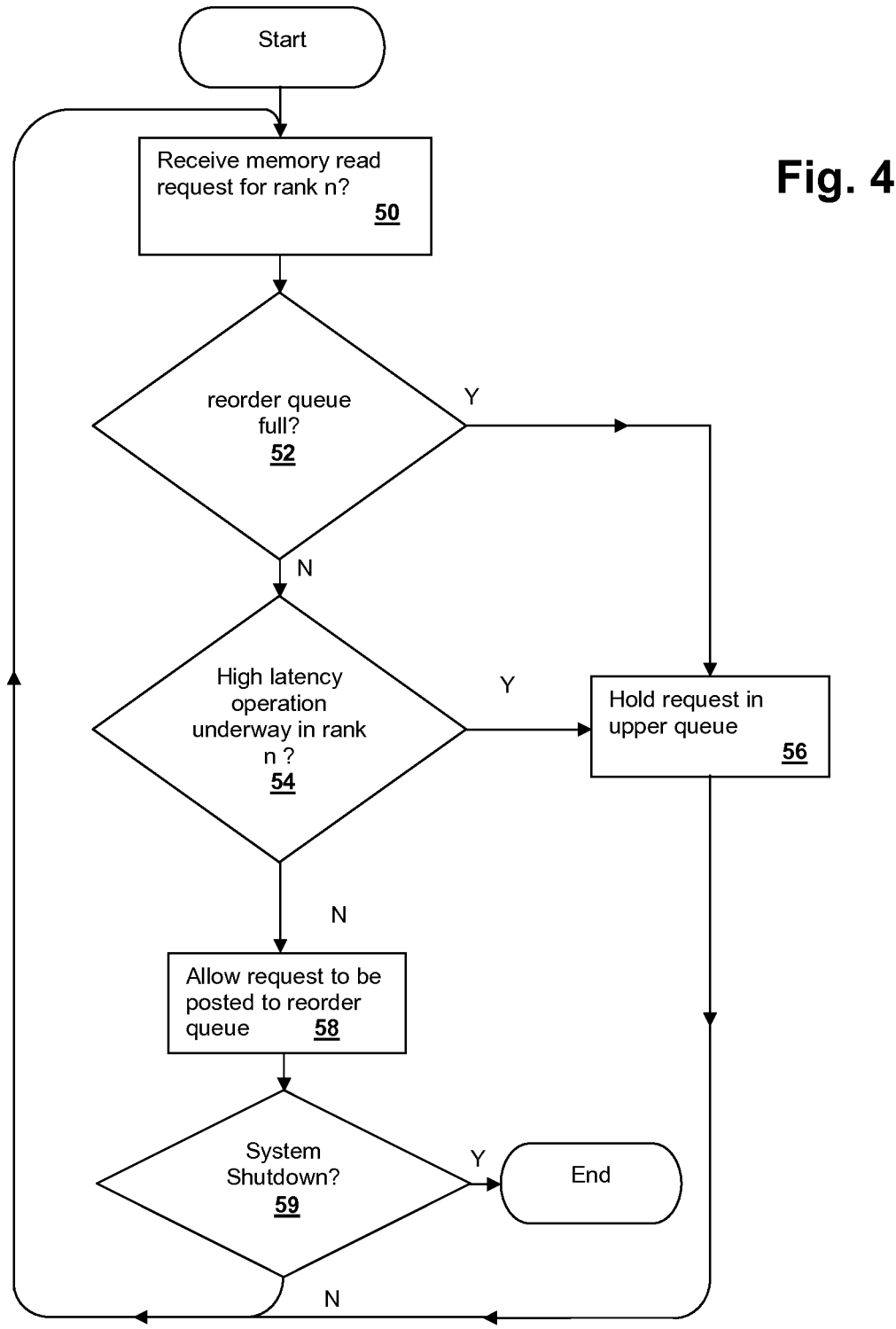
FIG. 4 is a flowchart depicting a method of managing memory access operations in accordance with an embodiment of the present invention.

Referring now to FIG. 4, a method of controlling memory access in accordance with an embodiment of the present invention is illustrated in a flowchart. A memory access request is received for rank n (step 50). If the re-order queue is full (step 52), or a high-latency operation is underway in rank n (step 54), then the request is held in the upper queue (step 56). If the re-order queue is not full (step 52) and no high-latency operation is underway in rank n (step 54), then the request is posted to the re-order queue (step 58). Until the system is shut down (step 59) the method of steps 50-58 are repeated to handle incoming memory accesses.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A memory controller for managing access to one or more memory devices, comprising:
    a bus interface for receiving memory access operations from a bus;
    a memory access queue for queuing multiple ones of the memory access operations in an order of their receipt;
    a re-order queue for queuing other multiple ones of the memory access operations, and from which the memory access operations are performed out-of-order;
    a memory device interface for issuing accesses to the one or more memory devices in response to the memory access operations; and
    a control logic for controlling the bus interface, the memory access queue, the memory device interface and the re-order queue such that an address specified by a given memory access operation in the memory access queue is compared to determine whether a high latency maintenance operation is being performed in a region of the one or more memory devices that includes the address, and responsive to determining that no high latency maintenance operation is being performed in the region of memory that includes the address, the control logic transfers the memory access operation to the re-order queue, and responsive to determining that a high latency maintenance operation is being performed in the region of memory that includes the address, rejects the transferring of the memory access operation to the re-order queue, whereby transfer of the memory access operation will be retried at a subsequent time.

2. The memory controller of claim 1, wherein the control logic, in response to determining that the re-order queue has an open entry, performs the determining whether the high latency maintenance operation is being performed, and only if no high latency memory operation is being performed in the region of memory, transfers memory access operation to the re-order queue.

3. The memory controller of claim 2, wherein the control logic further determines whether the queue contains a threshold number of memory access operations specifying an address within the region of memory, and rejects transferring the memory access operation to the re-order queue only if the re-order queue is full or the re-order queue already contains the threshold number of memory access operations specifying an address within the region of memory.

4. The memory controller of claim 3, wherein the threshold number of memory access operations is zero, wherein the transfer of any memory access operation specifying an address within the region of memory to the re-order queue is rejected.

5. The memory controller of claim 1, wherein the high latency memory operation is a refresh operation.

6. The memory controller of claim 1, wherein the high latency memory operation is a bus calibration interval.

7. The memory controller of claim 1, wherein the control logic further determines whether the queue contains a threshold number of memory access operations specifying an address within the region of memory, and rejects transferring the memory access operation to the re-order queue only if the re-order queue is full or the re-order queue already contains the threshold number of memory access operations specifying an address within the region of memory.

8. The memory controller of claim 7, wherein the threshold number of memory access operations is zero, wherein transfer of any memory access operation specifying an address within the region of memory is rejected.

9. The memory controller of claim 1, wherein the memory controller is integrated within a processor integrated circuit, and wherein the memory access operations are issued on an internal bus of the processor integrated circuit.

10. A computer system, comprising:
    a processor for executing program instructions;
    a memory for storing the program instructions and data; and
    a memory controller for managing access to the memory by the processor, wherein the memory controller comprises a bus interface for receiving memory access operations from a bus, a memory access queue for queuing multiple ones of the memory access operations in an order of their receipt, a re-order queue for queuing other multiple ones of the memory access operations, and from which the memory access operations are performed out-of-order, a memory device interface for issuing accesses to the one or more memory devices in response to the memory access operations, and a control logic for controlling the bus interface, the memory access queue, the memory device interface and the re-order queue such that an address specified by a given memory access operation in the memory access queue is compared to determine whether a high latency maintenance operation is being performed in a region of the one or more memory devices that includes the address, and responsive to determining that no high latency maintenance operation is being performed in the region of memory that includes the address, the control logic transfers the memory access operation to the re-order queue, and responsive to determining that a high latency maintenance operation is being performed in the region of memory that includes the address, rejects the transferring of the memory access operation to the re-order queue, whereby transfer of the memory access operation will be retried at a subsequent time.

11. The computer system of claim 10, wherein the control logic, in response to receiving the memory access operation, determines if the re-order queue is full and rejects the memory access operation if the re-order queue is full, and if the re-order queue is not full, determines whether the high latency maintenance operation is being performed, and only if no high latency memory operation is being performed in the region of memory, the control logic transfers the memory access operation to the re-order queue.

12. The computer system of claim 11, wherein the control logic further determines whether the queue contains a threshold number of memory access operations specifying an address within the region of memory, and rejects transfer of the memory access operation only if the re-order queue is full or the re-order queue already contains the threshold number of memory access operations specifying an address within the region of memory.

13. The computer system of claim 12, wherein the threshold number of memory access operations is zero, wherein transfer of any memory access operation specifying an address within the region of memory is rejected.

14. The computer system of claim 10, wherein the high latency memory operation is a refresh operation.

15. The computer system of claim 10, wherein the high latency memory operation is a bus calibration interval.

16. The computer system of claim 10, wherein the control logic further determines whether the queue contains a threshold number of memory access operations specifying an address within the region of memory, and rejects transfer of the memory access operation only if the re-order queue is full or the re-order queue already contains the threshold number of memory access operations specifying an address within the region of memory.

17. The computer system of claim 16, wherein the threshold number of memory access operations is zero, wherein transfer of any memory access operation specifying an address within the region of memory is rejected.

18. The computer system of claim 10, wherein the memory controller is integrated within the same integrated circuit as the processor, and wherein the access operations are issued on an internal bus of the integrated circuit.

19. A method of managing a queuing of access requests to one or more memory devices, the method comprising:
  receiving a memory access operation specifying an address;
  queuing the memory access operation in a memory access queue, in which memory operations are queued according to the order in which they are received;
  determining whether a high latency maintenance operation is being performed in a region of memory that includes the address;
  responsive to determining that no high latency maintenance operation is being performed in the region of memory that includes the address, transferring the memory access operation to a re-order queue from which multiple pending memory operations are issued out-of-order; and
  responsive to determining that a high latency maintenance operation is being performed in the region of memory, rejecting transferring the memory access operation to the re-order queue, whereby the transfer will be attempted at a subsequent time.

20. The method of claim 19, further comprising responsive to determining that the re-order queue has an open entry, performing the determining whether the high latency maintenance operation is being performed, and only if no high latency memory operation is being performed in the region of memory, transferring the memory access operation to the re-order queue.

21. The method of claim 20, wherein the determining further determines whether the re-order queue contains a threshold number of memory access operations specifying an address within the region of memory, and wherein the rejecting transferring the memory access operation is performed only if the re-order queue is full or the re-order queue already contains the threshold number of memory access operations specifying an address within the region of memory.

22. The method of claim 21, wherein the threshold number of memory access operations is zero, wherein the transferring of any memory access operation specifying an address within the region of memory is rejected.

23. The method of claim 19, wherein the high latency memory operation is a refresh operation.

24. The method of claim 19, wherein the high latency memory operation is a bus calibration interval.

25. The method of claim 19, wherein the determining further determines whether the re-order queue contains a threshold number of memory access operations specifying an address within the region of memory, and wherein the rejecting the transferring of the memory access operation is performed only if the re-order queue is full or the re-order queue already contains the threshold number of memory access operations specifying an address within the region of memory.

26. The method of claim 21, wherein the threshold number of memory access operations is zero, wherein transfer of any memory access operation specifying an address within the region of memory is rejected.

27. The method of claim 19, wherein the receiving a memory access operation is performed by a memory controller, and wherein the rejecting the transferring comprises issuing a retry operation response from a re-order queue controller.

28. The method of claim 27, wherein the memory controller is integrated within a processor integrated circuit, and wherein the retry operation and the memory access operation are issued on an internal bus of the processor integrated circuit.

* * * * *